(12) United States Patent
Vicknair (10) Patent No.: US 10,531,544 B2
(45) Date of Patent: Jan. 7, 2020

(54) PORTABLE BEAUTY LIGHT KIT

(71) Applicant: Rachel Vicknair, Beverly Hills, CA (US)

(72) Inventor: Rachel Vicknair, Beverly Hills, CA (US)

(*) Notice: Subject to any disclaimer, the term of this patent is extended or adjusted under 35 U.S.C. 154(b) by 466 days.

(21) Appl. No.: 15/490,765

(22) Filed: Apr. 18, 2017

(65) Prior Publication Data
US 2017/0303373 A1 Oct. 19, 2017

Related U.S. Application Data

(60) Provisional application No. 62/324,268, filed on Apr. 18, 2016.

(51) Int. Cl.
*H05B 37/02* (2006.01)
*F21V 33/00* (2006.01)
(Continued)

(52) U.S. Cl.
CPC ........... *H05B 37/0272* (2013.01); *F21K 9/00* (2013.01); *F21V 21/092* (2013.01); *H02J 7/0027* (2013.01); *H02J 7/0044* (2013.01); *H02J 7/022* (2013.01); *H05B 33/0845* (2013.01); *A47G 1/02* (2013.01); *F21W 2131/302* (2013.01); *H02J 2007/105* (2013.01)

(58) Field of Classification Search
CPC . H05B 37/0272; H05B 33/0845; H02J 7/022; H02J 7/0027; H02J 7/0044; H02J 2007/105; F21V 21/092; F21K 9/00; A47G 1/02; F21W 2131/302
See application file for complete search history.

(56) References Cited

U.S. PATENT DOCUMENTS 9,214,456 B2 12/2015 Doan
9,285,091 B2 3/2016 Danner et al.
(Continued)

OTHER PUBLICATIONS

Rajendra Bhatt, Infrared Toggle Switch for home appliances, http://www.electronics-lab.com/project/infrared-toggle-switch-for-home-appliances/, Aug. 2, 2015.
(Continued)

*Primary Examiner* — Rexford N Barnie
*Assistant Examiner* — Thai H Tran
(74) *Attorney, Agent, or Firm* — Wagenknecht IP Law Group PC (57) ABSTRACT

The disclosure concerns a portable beauty light kit, comprising a power management and control unit "PMC" and a plurality of light modules. The PMC comprises: a plurality of charging bays, and a signal transmitting circuit. Each of the individual light modules comprises: a light emitting source, a signal receiving circuit, and a housing. Each of the individual light modules is designed to nest within one of the charging bays of the PMC, wherein they receive a battery charge. Additionally, the light modules are designed to be taken from the charging bays of the PMC and removeably attached to a mirror. The signal receiving circuit of each light module is configured to receive a wireless signal communicated from the signal transmitting circuit of the PMC. The signal receiving circuit modulates a light emitting state associated with each light emitting source based on the signal communicated from the signal transmitting circuit.

20 Claims, 9 Drawing Sheets

(51) Int. Cl.
*F21V 5/00* (2018.01)
*H02J 7/00* (2006.01)
*H05B 33/08* (2006.01)
*F21K 9/00* (2016.01)
*F21V 21/092* (2006.01)
*H02J 7/02* (2016.01)
*F21W 131/302* (2006.01)
*H02J 7/10* (2006.01)
*A47G 1/02* (2006.01)

(56) References Cited

U.S. PATENT DOCUMENTS

| | | | |
|---|---|---|---|
| 9,414,458 B2 | 8/2016 | Pederson | |
| 9,561,449 B2 | 2/2017 | Wang et al. | |
| 9,581,323 B2 | 2/2017 | Shum | |
| 2005/0195593 A1* | 9/2005 | Horn | A47G 1/02 362/140 |
| 2007/0211452 A1* | 9/2007 | Gaunce | A47G 1/02 362/135 |
| 2007/0268686 A1* | 11/2007 | Tokushita | A45D 33/008 362/136 |
| 2011/0121654 A1 | 5/2011 | Recker et al. | |
| 2011/0283577 A1* | 11/2011 | Cornelissen | A47G 1/02 40/582 |
| 2012/0162970 A1* | 6/2012 | Bichrest | A45D 42/10 362/135 |
| 2014/0368112 A1* | 12/2014 | Adachi | A47G 1/02 315/76 |
| 2016/0057819 A1 | 2/2016 | Wang et al. | |
| 2017/0261188 A1* | 9/2017 | Brindle | A45D 42/10 |

OTHER PUBLICATIONS

Bill Bowden, Two Cell Li-Ion Charger, http://www.bowdenshobbycircuits.info/page12.htm, May 19, 2009.

Jayant, IR Transmitter and Receiver, https://circuitdigest.com/electronic-circuits/ir-transmitter-and-receiver-circuit, 20015-08-22.

* cited by examiner

PORTABLE BEAUTY LIGHT KIT

CROSS-REFERENCE TO RELATED APPLICATIONS

This application claims benefit of U.S. Provisional Ser. No. 62/324,268, filed Apr. 18, 2016; the entire contents of which are hereby incorporated by reference.

BACKGROUND OF THE INVENTION

Field of the Invention

This invention relates to a portable beauty light kit; and more particularly, to a kit including a control unit and a plurality of wirelessly activated and controlled light modules, wherein the light modules are configured to be: nested in the control unit for portability and recharging, and further configured to be removably attached to a mirror such that they may become wirelessly activated and controlled via the control unit.

Description of the Related Art

Beauty lights, or "vanity lights," are well known in the Art for use in connection with the application of cosmetics. When traveling, application of cosmetics often becomes difficult because there tends to be a lack of desirable lighting inside places like hotel rooms or dressing rooms. Also, there is often insufficient access to power, i.e. a wall outlet or plug. There is a need in the art for a portable beauty light kit with light modules that can be removably attached to a mirror, and wirelessly activated and controlled to provide a desired illuminance.

SUMMARY OF THE INVENTION

The disclosure concerns a portable beauty light kit, the kit comprising a power management and control unit, hereafter referred to as a "PMC", and a plurality of wirelessly controlled light modules configured to wirelessly couple with the PMC for control and activation thereof.

In various embodiments, the PMC comprises: a plurality of charging bays, and a signal transmitting circuit. Moreover, each of the individual light modules comprises: a visible light emitting source, a signal receiving circuit, and a housing.

Each of the individual light modules is designed to nest within one of the plurality of charging bays of PMC, wherein the light modules are adapted to receive a battery charge. Additionally, the light modules are designed to be taken from the charging bays of PMC and removeably attached to a mirror via an attachment means, such as micro suction foam, a suction cup, or the like.

The signal receiving circuit of each of the light modules is configured to receive a wireless signal communicated from the signal transmitting circuit of the PMC. The signal receiving circuit modulates the light emitting state associated with each light emitting source based on the signal communicated from the signal transmitting circuit, said light emitting state selected from: "on", "off", or "dimmed".

BRIEF DESCRIPTION OF THE DRAWINGS

These and other features will be further understood by those with skill in the art upon a review of the appended drawings, wherein:

FIG. 4C shows a side view of a light module in accordance with various embodiments herein; the left and right sides being similar.

DETAILED DESCRIPTION OF THE PREFERRED EMBODIMENTS

For purposes of explanation and not limitation, details and descriptions of certain preferred embodiments are hereinafter provided such that one having ordinary skill in the art may be enabled to make and use the invention. These details and descriptions are representative only of certain preferred embodiments. However, a myriad of other embodiments which will not be expressly described will be readily understood by those having skill in the art upon a thorough review hereof. Accordingly, any reviewer of the instant disclosure should interpret the scope of the invention by the claims, and such scope shall not be limited by the embodiments described and illustrated herein.

In a general embodiment, a portable beauty light kit is provided. The portable beauty light kit includes: (i) a power management and control unit comprising a plurality of charging bays and a signal transmitting circuit; and (ii) a plurality of light modules, each of the light modules independently comprising a light emitting source, a signal receiving circuit, and a housing, at least a portion of the light emitting source and the signal receiving circuit being enclosed within the housing, wherein the signal receiving circuit is configured to receive a wireless signal communicated from the signal transmitting circuit.

The kit is further characterized in that each of the plurality of light modules is configured to: (i) removeably attach with a mirror for providing light therefrom, (ii) nest within one of the plurality of charging bays of the power management and control unit, wherein the light modules are each adapted to receive a battery charge when nested in the one of the plurality of charging bays, and (iii) modulate a light emitting state associated with each light emitting source based on the signal communicated from the signal transmitting circuit, said light emitting state selected from: "on", "off", or "dimmed".

In some embodiments, the power management and control unit further comprises a battery charging module coupled to pins, wherein the pins are positioned at each of the charging bays. The battery charging module is generally adapted to couple with a battery of each of the light modules for charging.

In some embodiments, each of the plurality of light modules is configured to receive a battery therein for powering the light emitting source, the signal receiving circuit, or a combination thereof. The battery can comprise a lithium polymer or lithium ion battery adapted to supply between 2.0 volts to 5.0 volts, or other voltage as would be understood by those with skill in the art.

In some embodiments, the signal receiving circuit comprises a photo detector. The photo detector may comprise an infrared photo detector. The infrared photo detector can be adapted to detect infrared signals at a center frequency selected from: 30 Khz, 38 KHz, or 40 KHz.

In some embodiments, the signal transmitting circuit comprises one or more infrared light emitting diodes. The one or more infrared light emitting diodes can be coupled to the power management and control unit. Moreover, the one or more infrared diodes can be configured to emit infrared light upon activation of the signal transmitting circuit. The signal transmitting circuit may comprise a switch, button, or variable reactance component for activation thereof. The variable reactance component can comprise a variable resistor, variable capacitor or variable inductor. The signal transmitting circuit may comprise a circuit configured to modulate infrared signal at a center frequency detectable by the signal receiving circuit. In this regard, the signal transmitting circuit may be configured to generate a modulated infrared signal at a center frequency selected from: 30 Khz, 38 KHz, or 40 KHz.

In some embodiments, each housing of the light modules may comprise a front surface and a rear surface; the housing being adapted to expose at least a portion of the light emitting source through the front surface thereof. The housing may further comprise one or more apertures extending through the housing at the front surface thereof, and one or more lenses, each of the lenses extending through one or the one or more apertures of the housing, respectively. The light emitting source can comprise one or more light emitting diodes, wherein each of the one or more light emitting diodes is positioned adjacent to one of the one or more apertures and one or more lenses, respectively. Each of the light modules may further comprise a micro-suction foam coupled to the housing at the rear surface thereof, wherein the micro-suction foam is configured to removeably attach the respective light module with the mirror. The micro-suction foam may comprise acrylic foam having a plurality of micro cavities configured to function as a series of micro suction cups.

EXAMPLE 1

Figure 1:
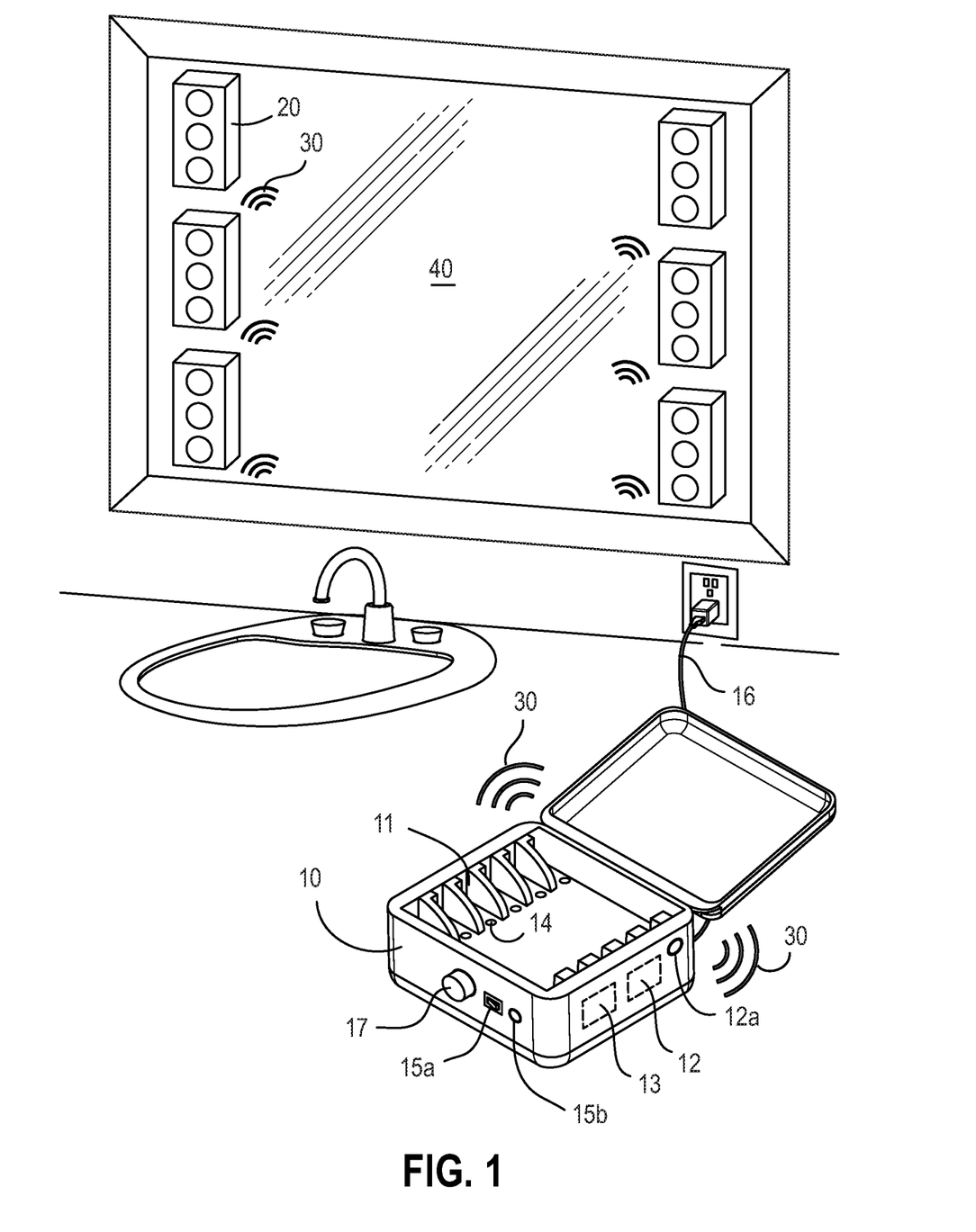
FIG. 1 shows portable beauty light kit in accordance with a first embodiment, the kit being deployed on a countertop with a plurality of light modules removably mounted on a mirror, and a PMC unit being positioned on the countertop and plugged into an AC wall outlet for sourcing power, wherein the PMC unit is shown communicating a signal to each of the light modules for controlling a state thereof.

Now, turning to the drawings, FIG. 1 shows a first illustrated embodiment of a portable beauty light kit deployed on a countertop nearby a mirror. The kit includes a power management and control unit "PMC" 10 and a plurality of light modules 20 removably mounted on a mirror 40. The PMC unit 10 is shown positioned on the countertop. Here, a wireless signal 30 is indicated, illustrating a communication signal propagating from the signal transmitting circuit 12 of the PMC, to the signal receiving circuit (22, FIG. 4) of each of the individual light modules 20. This infrared signal 30 allows the PMC 10 to uniformly control the light emitting state and brightness of the light modules 20. Here, the wireless signal 30 is deployed by one or more infrared LEDs 12a.

While the first illustrated embodiment described herein utilizes infrared (IR) signal transmission, those having skill in the art will appreciate that the portable beauty light kit may utilize any form of electromagnetic signal communication to achieve modulation of the light emitting state; i.e. "on", "off" or "dimmed". For example, signal communication may be achieved utilizing Bluetooth, radiofrequency (RF), or other applications known to those having skill in the art. For purposes herein, the embodiments will be described with reference to infrared communication only.

With further reference to FIG. 1, the PMC 10 receives power from a wall outlet via the A/C Power cord 16. The A/C power cord may be any conventional universal serial bus (USB) cord or other cord. In this embodiment, the PMC 10 is configured with six charging bays 11, each having a corresponding charging pin 14 and being configured to receive one of the light modules. The light modules are each configured with charging adapter pins 28 (See FIG. 4) complementing the charging pins 14 of the PMC. When the light modules 20 are turned "off", removed from the mirror, and stored in the charging bays 11 of the PMC, the battery circuit of the light modules is coupled to the battery charging module 13 of the PMC via the union of the charging pins 14 of each charging bay 11, and the charging adapter pins 28 of each light module 20.

Also shown is a power switch 15a which is operated by a user to turn the light modules "on" or "off", a status LED 15b for informing the user of the present status of the unit; i.e. whether the lights are configured "on" or "off". Further shown is an optional dial coupled to a variable reactance component, hereinafter the combination being referred to as the "variable reactance component 17".

The PMC unit may comprise a battery for signaling operation when not plugged in; however, it will be preferred to provide charging of the light modules when docked in the charging bays only when the PMC unit is plugged in to a power source, such as a wall outlet.

Figure 2:
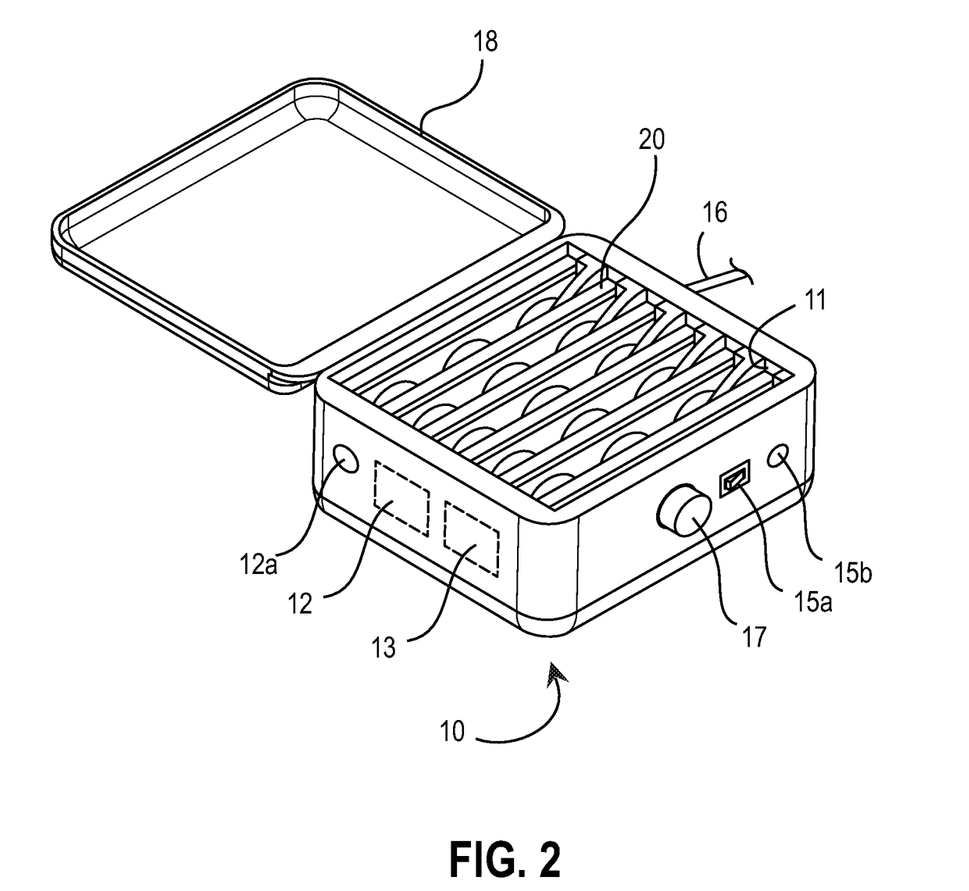
FIG. 2 shows the PMC unit in accordance with the first embodiment, wherein the PMC unit is shown having a plurality of charging bays, the light modules are shown nested in the charging bays where they are configured to receive a battery charge via a connection therebetween.

FIG. 2 shows the power management and control unit "PMC" 10 with six charging bays 11 and six light modules 20 nested therein. The PMC may optionally comprise a lid 18, for example, where the PMC serves as a portable travel case. The PMC 10 further comprises a signal transmitting circuit 12, an infrared LED 12a, a battery charging module 13, a power switch 15a, a status indicator LED 15b, a variable reactance component 17, and an AC power chord 16.

When the light modules 20 are removed from the charging bays 11 of the PMC, and mounted to a mirror, they can then be uniformly controlled via the power switch 15a and variable reactance component 17 of the PMC. This allows the user to mount the light modules as desired, then wirelessly activate and control them via the PMC 10. During use, the LED status indicator 15b conveys to the user the current state "on" or "off" associated with the light modules.

This is achieved by coupling the variable reactance component 17 of the PMC 20 to the signal transmission circuit 12 of the PMC 10. The variable reactance component 17 varies the wireless signal 30 emitted by the infrared LED 12A. Thus for example, when the user adjusts the variable reactance component, the frequency at which light is emitted by the infrared LED 12a is correspondingly modulated. The wireless signal 30 then propagates from the PMC 10 to each of the individual light modules 20. The signal is received via an infrared photo detector and processed via the signal receiving circuit. The signal receiving circuit then changes the light emitting state of the light module's light emitting sources according to the corresponding light emitting state of the received propagated frequency. The light emitting sources of the light modules 20 then provide the illuminance as set and desired by the user.

Figure 3:
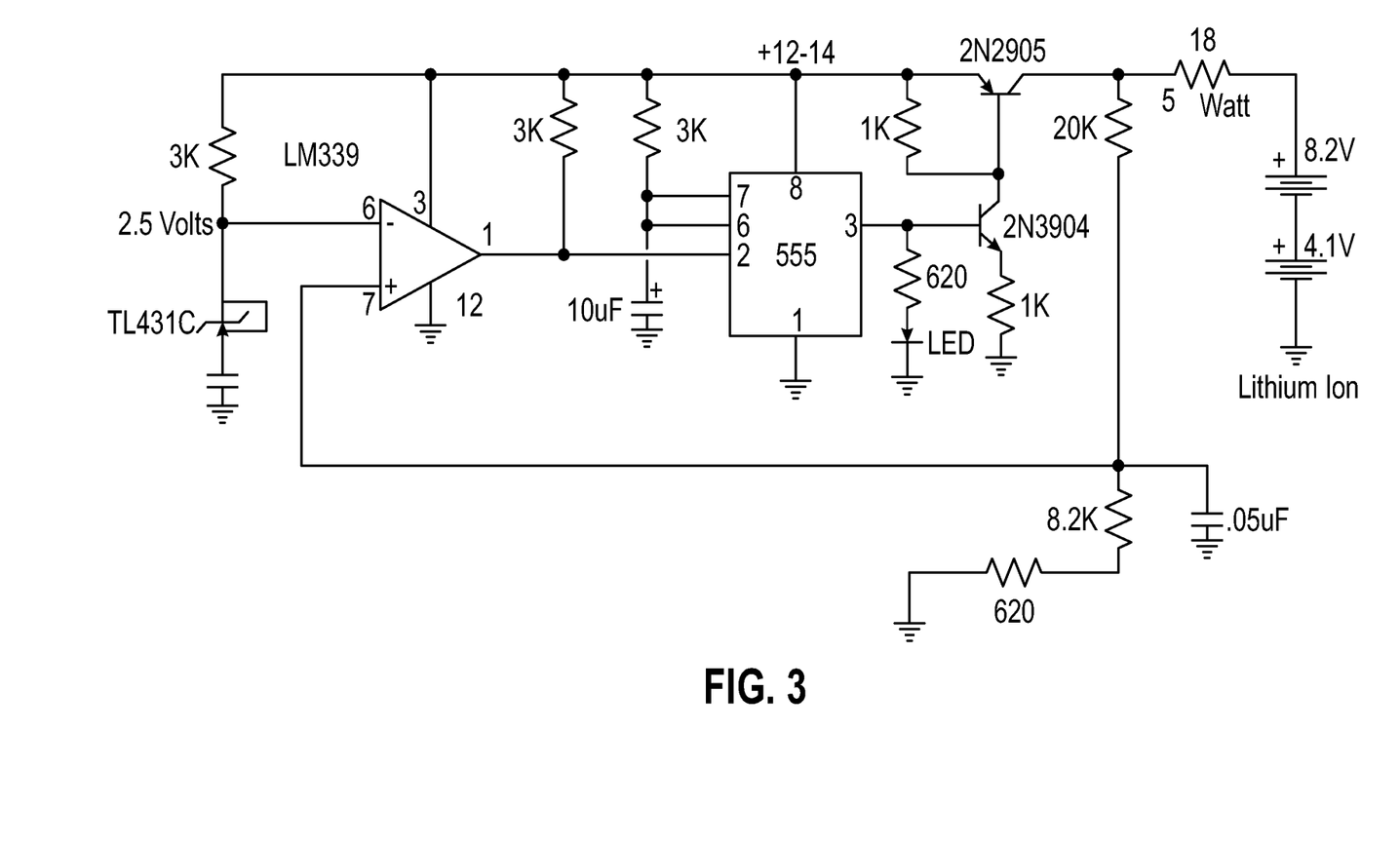
FIG. 3 shows an electrical schematic of a battery charging module for use with the PMC unit of the beauty light kit.

FIG. 3 shows an electrical schematic of a battery charging module as used in the first illustrated embodiment. It will be understood by those with skill in the art that many possible circuits may be implemented for the purpose for providing battery charging. Here, the battery of each light module is shown to comprise a Lithium Ion Battery. The charger generally operates by supplying a short current pulse through a series resistor and then monitoring the battery voltage to determine if another pulse is required. The current can be adjusted by changing the series resistor or adjusting the input voltage. When the battery is low, the current pulses are spaced close together so that a somewhat constant current is present. As the batteries reach full charge, the pulses are spaced farther apart and the full charge condition is indicated by a supplemental LED blinking at a slower rate (optional).

A TL431 shunt regulator, or equivalent, band gap voltage reference (2.5 volts) is used on pin 6 of the comparator so the comparator output will switch low, triggering the 555 timer when the voltage at pin 7 is less than 2.5 volts. The 555 output turns on the 2 transistors and the batteries charge for about 30 milliseconds. When the charge pulse ends, the battery voltage is measured and divided down by the combination 20K, 8.2K and 620 ohm resistors so when the battery voltage reaches 8.2 volts, the input at pin 7 of the comparator will rise slightly above 2.5 volts and the circuit will stop charging.

The circuit could be used to charge other types of batteries such as Ni-Cad, NiMh or lead acid, but the shut-off voltage will need to be adjusted by changing the 8.2K and 620 ohm resistors so that the input to the comparator remains at 2.5 volts when the terminal battery voltage is reached.

For example, to charge a 6 volt lead acid battery to a limit of 7 volts, the current through the 20K resistor will be $(7-2.5)/20K=225$ microamps. This means the combination of the other 2 resistors (8.2K and 620) must be $R=E/I=2.5/225 uA=11,111$ ohms. But this is not a standard value, so one could use a 10K in series with a 1.1K, or some other values that total 11.11K.

While specific components and arrangements thereof are illustrated in this example, it will be readily understood that a variety of battery charging modules may be employed for the purpose of providing battery charging.

Figure 4A:
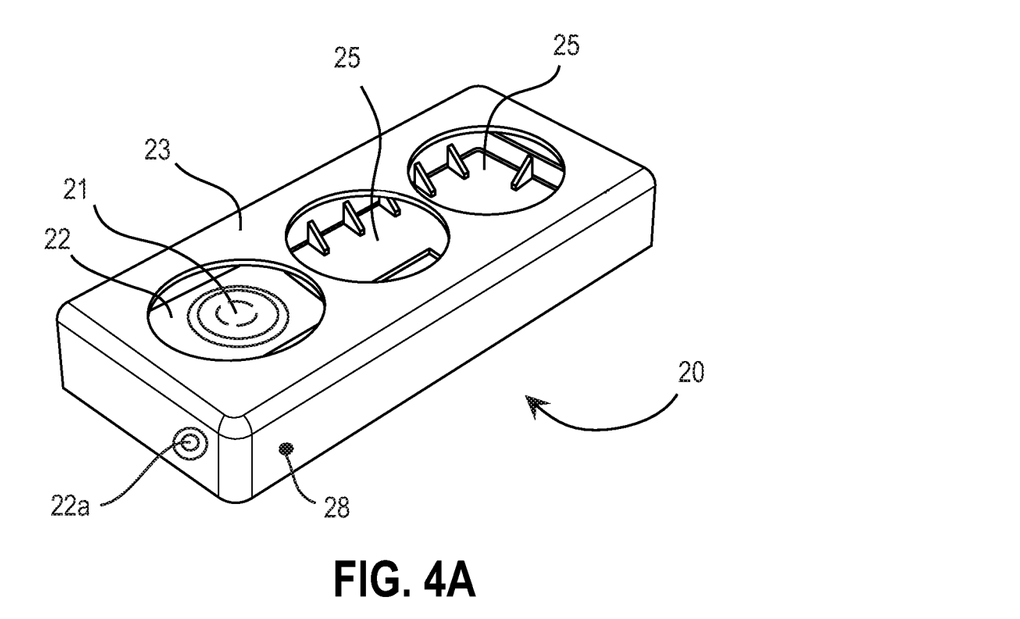
FIG. 4A shows an exterior surface of a front side of a light module housing, and further shows an aperture configured to receive a lens therethrough.

FIG. 4A shows the exterior front of a light module housing 23, and apertures 25. In this example, the light module is shown being configured for three independent light sources; however, any number of light sources may be similarly deployed. Adjacent to the apertures can be implemented a light emitting source 21, which may be disposed on a circuit board containing at least a portion of the signal receiving circuit 22. In addition, the infrared photo detector 22a of the signal receiving circuit 22 is shown disposed on an exterior surface of the light module 20. Also shown is a charging adapter pin 28 for connecting the battery (not shown) disposed within the light module to the battery charging module of the PMC.

Figure 4B:
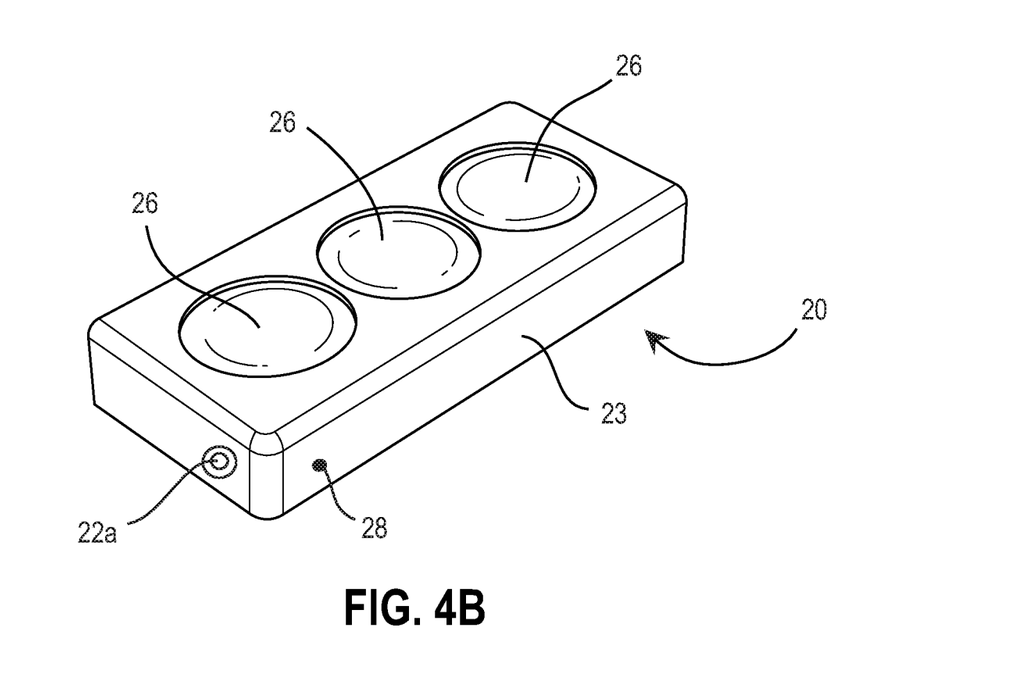
FIG. 4B shows an exterior surface of the front side of the light module, and further shows a plurality of lenses integrated with the apertures.

FIG. 4B shows a perspective view of a light module 20. The light module 20 comprises an infrared photo detector 22a, charging adapter pin 28, and a housing 23. Also shown are three lenses 26 each coupled to the housing at a corresponding aperture thereof, and each lens being positioned adjacent to one of the light emitting sources (21, see FIG. 4A).

Figure 4C:
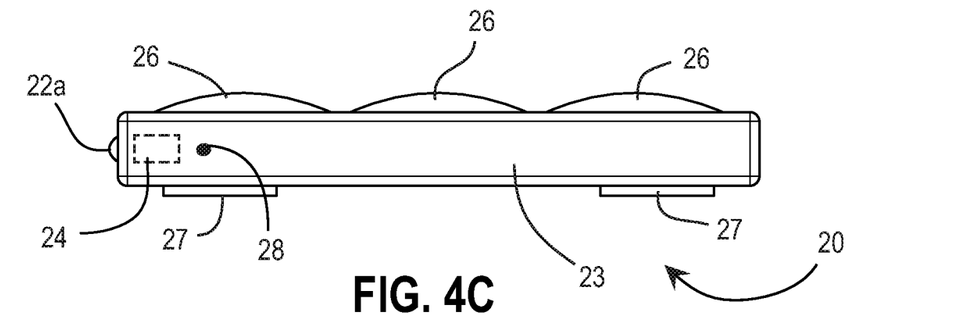

FIG. 4C shows a side view of the light module, including the housing 23 having lenses 26 extending through apertures at the top surface thereof, and an infrared photo detector 22a configured to receive the wireless signal for changing a state of the light module. Charging adapter pin 28 is shown being disposed on a side of the light module and configured to contact a corresponding charging pin of the PMC. On a bottom surface (opposite the top surface) is disposed one or more micro suction foam elements 27, these micro suction foam elements may comprise an acrylic foam configured with a plurality of micro porous suction cups adapted to provide an attachment capability to any smooth flat surface, such as a glass surface of a mirror. The light module further includes a battery 24 which can be disposed anywhere within or adjacent to the housing 23.

Figure 4D:
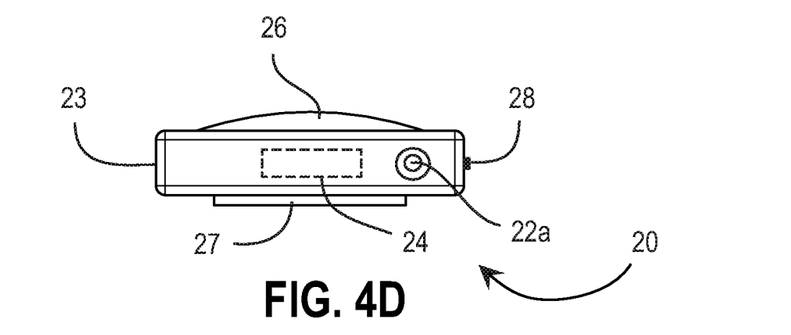
FIG. 4D shows a bottom view of the light module in accordance with the various embodiments; the light module is shown to include charging adapter pins.

FIG. 4D shows a bottom view of the light module 20 in accordance with the first illustrated embodiment. The light module is shown with the lens 26 protruding through an aperture of the front surface of the housing 23, and a battery 24 disposed within the housing. Also shown is the infrared photo detector 22a and charging pin 28 each protruding through the housing 23. Micro suction foam elements 27 can be appreciated from the present view.

Figure 4E:
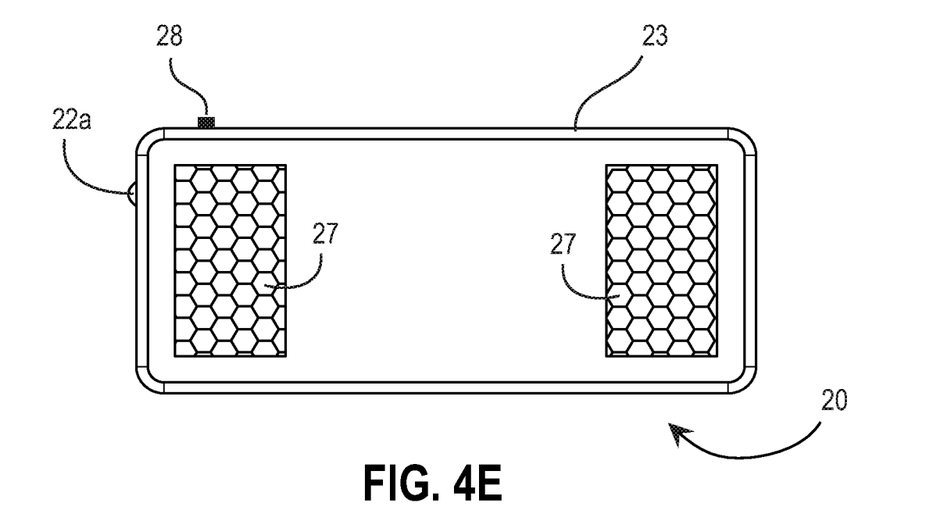
FIG. 4E shows an exterior rear surface of the light module in accordance with the various embodiments, wherein the light module further includes micro-suction foam elements mounted thereon.

FIG. 4E shows the exterior rear of the light module 20 with micro-suction foam 27 mounted on the housing 23. The micro-suction foam 27 enables the device to be removeably attached to a mirror, or any hard surface. The micro-suction foam 27 comprises acrylic foam having a plurality of micro cavities configured to function as micro suction cups. The micro cavities comprise millions of microscopic pores, wherein when pressure is applied, the air inside the pores of the foam is vacated, and a vacuum is achieved. This vacuum provides a force, removably attaching the light modules to any flat hard surface. Also shown is charging pin 28 and photo detector 22a each protruding through the housing 23.

Figure 5:
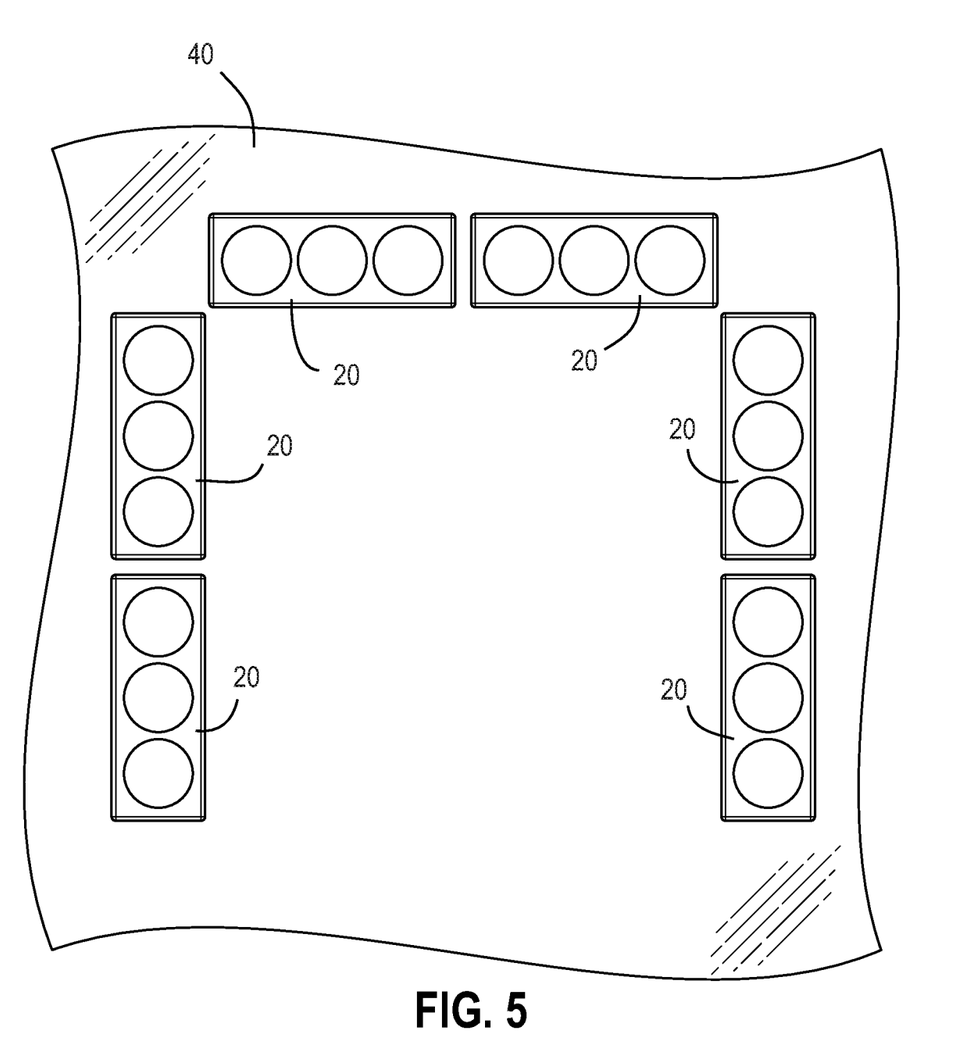
FIG. 5 shows an arrangement of light modules removably attached to a mirror.

FIG. 5 shows one possible arrangement of light modules 20 being removably attached to a mirror 40.

While the illustrated embodiment shows the light modules attached to a mirror, it is within the scope of the invention that a user might hold a light module in her hand.

Signal Transmitting and Receiving Circuits

Figure 6:
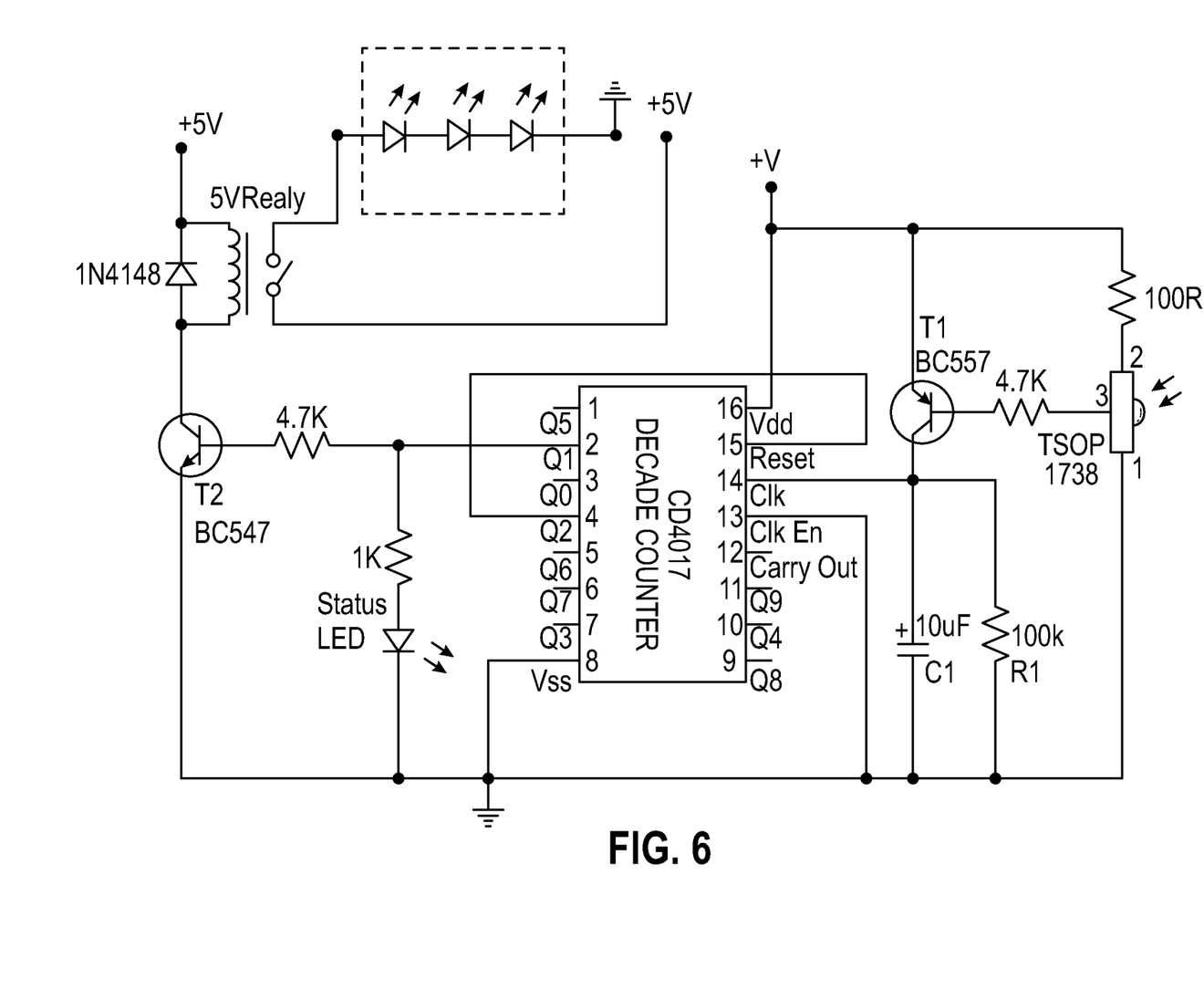
FIG. 6 shows an electrical schematic of a signal receiving circuit in accordance with a preferred embodiment.

FIG. 6 shows an electrical schematic of an IR signal receiving circuit as used in the first illustrated embodiment. The infrared photo detector of each light module is configured to receive an IR signal and correspondingly modulate the light emitting state of each light emitting source, respectively. The signal receiving circuit can be this or any other signal receiving circuit known to those skilled in the art.

The TSOP 1738 IR receiver module detects the 38 KHz input pulses received from the signal transmitting circuit of the PMC. Under stand-by condition, the output pin of the IR module is at logic High, and when it detects the pulses, they appear at its output. The output from IR receiver is fed to a PNP transistor (BC557) with a series base resistor of 4.7K. At the collector of the NPN transistor, the pulses will be inverted. There is a 10 uF capacitor and 100K resistor connected from the collector to ground. The function of capacitor is to convert the pulses into a single pulse, and the resistor is to provide the discharge path for the capacitor.

During standby, the output of IR receiver module is High, so BC557 is cut off. The capacitor is fully discharged, and the collector of BC557 is at ground. When the button, switch, or dimmer is actuated on the PMC, the pulses arrived at the base of BC557 turns it ON and OFF very fast. When it is ON, the capacitor gets charged through the collector current of BC557, and when it is OFF, the capacitor starts to discharge through the 100K resistor. But the pulses is so fast (38000 pulses per second) that the capacitor doesn't get chance to discharge. In this regard, every time a button, switch or dimmer is actuated from the PMC, a positive going clock pulse is generated at the collector of BC557 transistor.

This circuit is one example which can be implemented for modulating a state of the light modules, that is, "on", "off", or "dimmed". Other similar circuits and configurations may be similarly deployed for the purpose of receiving IR signals from the PMC and modulating a state of the light modules.

Figure 7:
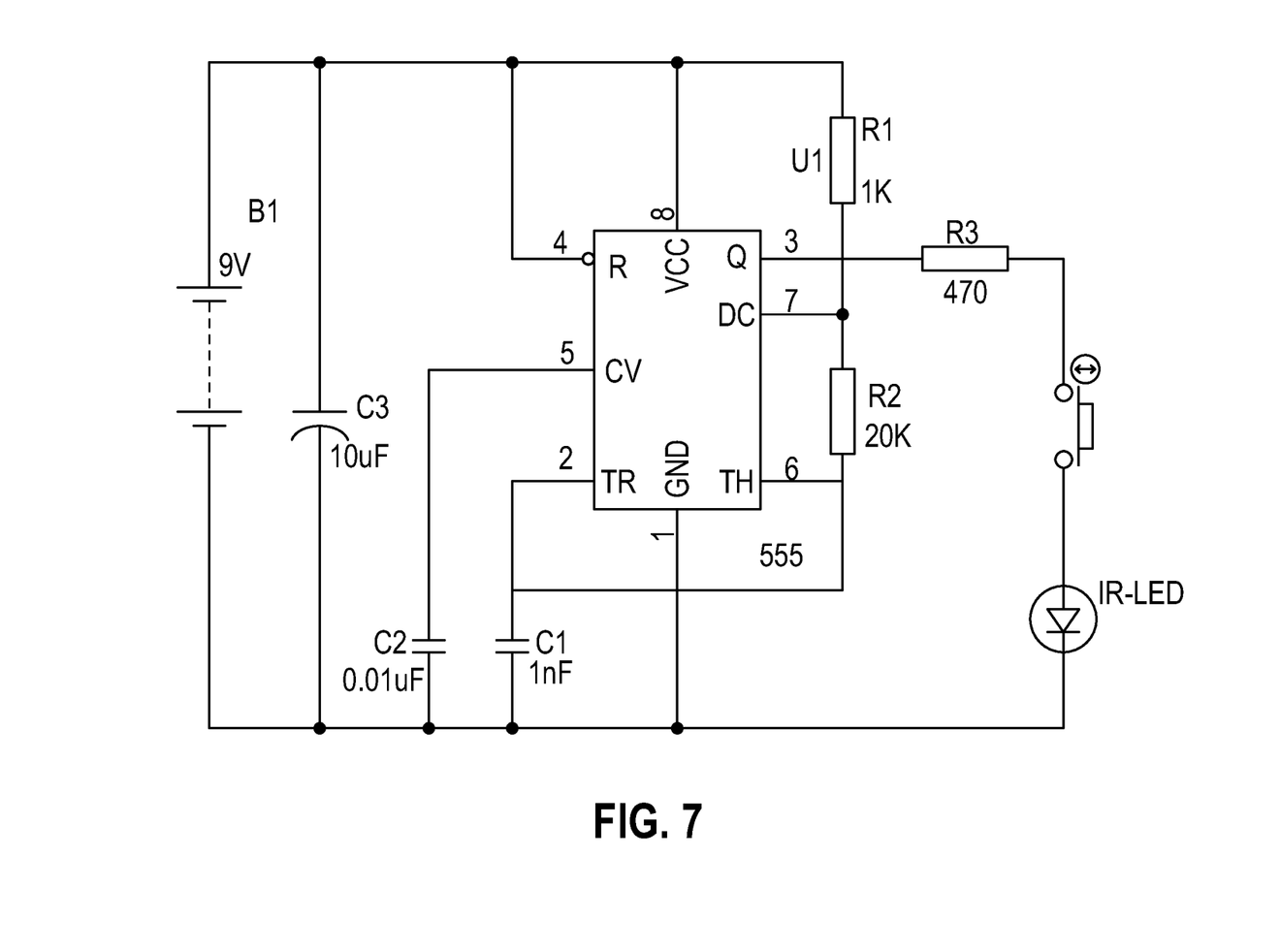
FIG. 7 shows an electrical schematic of a signal transmitting circuit in accordance with the preferred embodiment.

FIG. 7 shows an electrical schematic of an IR signal transmitting circuit in accordance with one embodiment. The PMC has an IR signal transmitting circuit comprising a power source, an integrated circuit, a plurality of transistors, a plurality of capacitors, a switch or variable reactance component 17, and one or more IR LED's. The signal transmitting circuit of the PMC is configured to transmit the IR signal from the PMC to the light modules allowing the user to set a desired illuminance from the light modules, wirelessly. The signal transmitting circuit can be this or any other signal transmitting circuit known to those skilled in the art.

In the illustrated embodiment, a TSOP1738 is implemented as the receiver, since the signal is a modulated IR of 38 kHz. One may use any TSOP, but must generate IR of respective frequency as the TSOP being implemented. Here is shown a 555 timer in Astable mode to oscillate the IR at 38 KHz frequency. The oscillation frequency of 555 timer is decided by resistor R1, R2 and capacitor C1. As shown, R1 is 1K ohm, R2 is 20K ohm and capacitor C1 is 1 nF to generate the frequency of approx. 38 KHz. The frequency can be calculated using the formula: $1.44/((R1+2*R2)*C1)$. Output Pin 3 of the 555 Timer IC is shown connected to IR LED using a 470 ohm resistor and a push button switch. When the button of the switch is depressed, the circuit emits modulated IR at 38 KHz. Note here that a push button switch may be replaced with a toggle, a dial, or other switch. A 10 uF capacitor C3 is connected across the supply to provide the constant supply to the circuit, without any ripple.

Again, this circuit is one example which can be implemented for modulating a state of the light modules, that is, "on", "off", or "dimmed". Other similar circuits and configurations may be similarly deployed for the purpose of transmitting IR signals from the PMC and modulating a state of the light modules.

EXAMPLE 2

Figure 8A:
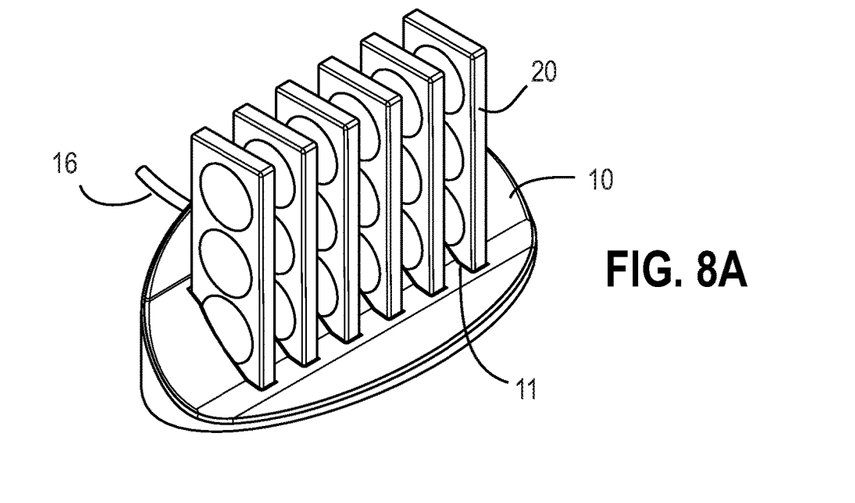
FIG. 8A illustrates another embodiment of a portable beauty light kit, from a front-perspective view wherein a power management and control unit is shown including a base and a plurality of slots configured to receive corresponding light modules in each slot such that the light modules are oriented in a vertical arrangement.
Figure 8B:
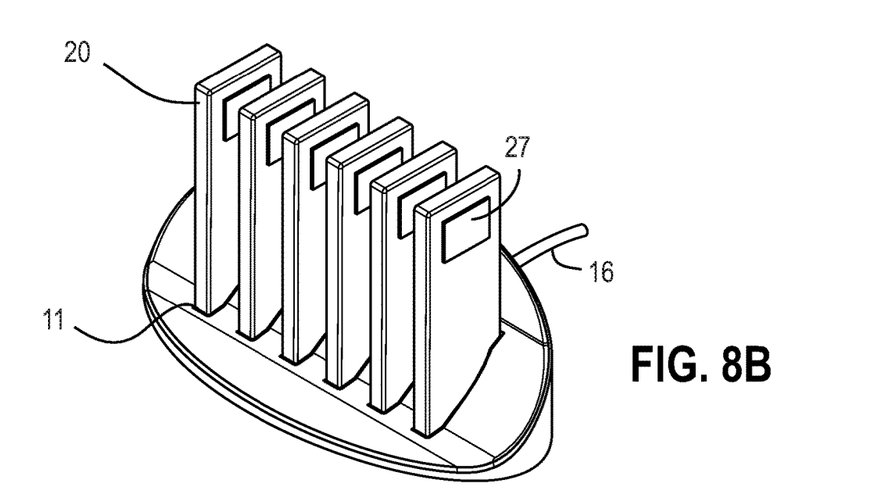
FIG. 8B shows the portable beauty light kit of FIG. 8A from a rear perspective view.
Figure 8C:
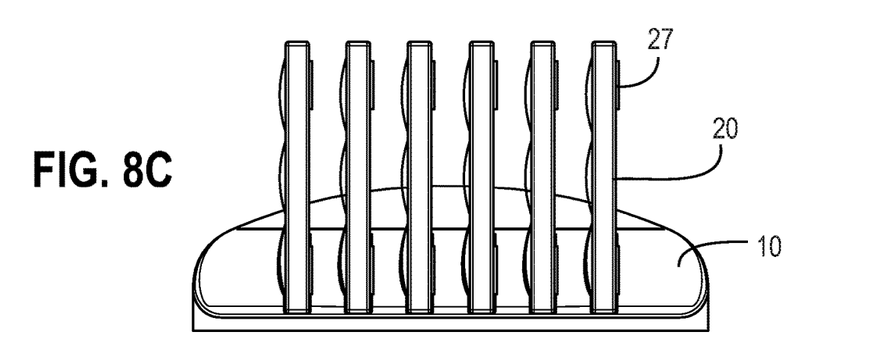
FIG. 8C shows the portable beauty light kit of FIG. 8A from a side view.

FIGS. 8(A-c) illustrate a second illustrated embodiment of a portable beauty light kit.

FIG. 8A shows a front perspective view of the portable beauty light kit of the second illustrated embodiment. The kit comprises a power management and control (PCM) unit 10, which serves as a docking base containing a plurality of charging bays 11. Each charging bay is configured to receive a corresponding light module, and provide a charge to a battery housed therein. The kit is shown with six light modules 20, however any number of light modules and corresponding charging bays may be similarly implemented. The PMC is powered by a usb or similar power cord 16, which further plugs into a conventional power outlet. While having a unique shape and design, the functional aspects of this second illustrated embodiment are similar to that of the first illustrated embodiment, and as such, further details of the various circuits are incorporated from the above-referenced details and descriptions.

FIG. 8B shows a rear perspective view of the portable beauty light kit. Here, the light modules 20 are shown with micro suction foam 27. Also shown are the charging bays 11 of the PMC, and power cord 16.

FIG. 8C shows a side view of the portable beauty light kit, wherein the light modules 20, micro suction foam 27, and the PMC 10 may be further appreciated.

It should be disclosed that while micro suction foam is the preferred element for removeably attaching each of the light modules to the mirror, other adhesive and similar elements may be deployed, such as conventional suction cups, tape, Velcro, and the like.

Now, although particular features and embodiments have been described in an effort to enable those with skill in the art to make and use the claimed invention, it should be understood that several variations, alterations or substitutions can be achieved to arrive at a portable beauty light kit comprising a power and control unit and wireless light modules. Nothing in this description shall be construed as limiting the spirit and scope of the invention as set forth in the appended claims, below.

While not shown in the drawings, it will be appreciated by one with skill in the art that a cell phone and software application ("app") can be implemented for communicating with the PMC unit, the light modules, or both. In this regard, Bluetooth technology can be used as an off the shelf example.

FEATURE LIST (10) power management and control unit
(11) charging bay
(12) signal transmitting circuit
(12a) infrared light emitting diodes
(13) battery charging module
(14) charging pins
(15a) power switch
(15b) status LED
(16) AC power cord
(17) variable reactance component
(18) lid
(20) light module
(21) light emitting source
(22) signal receiving circuit
(22A) infrared photo detector
(23) housing
(24) battery circuit (24A) battery
(25) aperture
(26) lens
(27) micro-suction foam
(28) charging adapter pins
(30) wireless signal
(40) mirror

What is claimed is:

1. A portable beauty light kit, comprising:
 a power management and control unit comprising a plurality of charging bays and a signal transmitting circuit; and
 a plurality of light modules, each of the light modules independently comprising a light emitting source, a signal receiving circuit, and a housing, at least a portion of the light emitting source and the signal receiving circuit being enclosed within the housing, wherein the signal receiving circuit is configured to receive a wireless signal communicated from the signal transmitting circuit;
 characterized in that:
 each of the plurality of light modules is configured to:
  removably attach with a mirror for providing light therefrom,
  nest within one of the plurality of charging bays of the power management and control unit, wherein the light modules are each adapted to receive a battery charge when nested in the one of the plurality of charging bays, and
  modulate a light emitting state associated with each light emitting source based on the signal communicated from the signal transmitting circuit, said light emitting state selected from: "on", "off", or "dimmed".

2. The portable beauty light kit of claim 1, wherein said power management and control unit further comprises a battery charging module coupled to pins, wherein the pins are positioned at each of the charging bays.

3. The portable beauty light kit of claim 2, wherein said battery charging module is adapted to removably couple with a battery of each of the light modules for charging.

4. The portable beauty light kit of claim 1, wherein each of the plurality of light modules is configured to receive a battery therein for powering the light emitting source, the signal receiving circuit, or a combination thereof.

5. The portable beauty light kit of claim 4, wherein the battery comprises a lithium polymer or lithium ion battery adapted to supply between 2.0 volts to 5.0 volts.

6. The portable beauty light kit of claim 1, wherein the signal receiving circuit comprises a photo detector.

7. The portable beauty light kit of claim 6, wherein the photo detector comprises an infrared photo detector.

8. The portable beauty light kit of claim 7, wherein the infrared photo detector is adapted to detect infrared signals at a center frequency selected from: 30 Khz, 38 KHz, or 40 KHz.

9. The portable beauty light kit of claim 1, wherein the signal transmitting circuit comprises one or more infrared light emitting diodes.

10. The portable beauty light kit of claim 9, wherein the one or more infrared light emitting diodes are coupled to power management and control unit.

11. The portable beauty light kit of claim 10, wherein the one or more infrared diodes are configured to emit infrared light upon activation of the signal transmitting circuit.

12. The portable beauty light kit of claim 11, wherein the signal transmitting circuit comprises a switch, button, or variable reactance component for activation thereof.

13. The portable beauty light kit of claim 12, wherein the variable reactance component comprises a variable resistor, variable capacitor or variable inductor.

14. The portable beauty light kit of claim 9, wherein the signal transmitting circuit comprises a circuit configured to modulate infrared signal at a center frequency detectable by the signal receiving circuit.

15. The portable beauty light kit of claim 14, wherein the signal transmitting circuit is configured to generate a modulated infrared signal at a center frequency selected from: 30 Khz, 38 KHz, or 40 KHz.

16. The portable beauty light kit of claim 1, wherein each housing comprises a front surface and a rear surface, the housing adapted to expose at least the portion of the light emitting source through the front surface thereof.

17. The portable beauty light kit of claim 16, wherein the housing further comprises one or more apertures extending through the housing at the front surface thereof, and one or more lenses, each of the lenses extending through one or the one or more apertures of the housing, respectively.

18. The portable beauty light kit of claim 17, wherein the light emitting source comprises one or more light emitting diodes, wherein each of the one or more light emitting diodes is positioned adjacent to one of the one or more apertures and one or more lenses, respectively.

19. The portable beauty light kit of claim 16, wherein each of the light modules further comprises a micro-suction foam coupled to the housing at the rear surface thereof, wherein the micro-suction foam is configured to removably attach the respective light module with the mirror.

20. The portable beauty light kit of claim 19, wherein the micro-suction foam comprises acrylic foam having a plurality of micro cavities configured to function as micro suction cups.

* * * * *